United States Patent [19]

Alfenaar et al.

[11] 4,127,468
[45] Nov. 28, 1978

[54] PROCESS FOR PREPARING A METAL ELECTRODE

[75] Inventors: Marinus Alfenaar, Schinnen; Cornelis G. M. van de Moesdijk, Elsloo, both of Netherlands

[73] Assignee: Stamicarbon, B.V., Geleen, Netherlands

[21] Appl. No.: 665,448

[22] Filed: Mar. 9, 1976

[30] Foreign Application Priority Data

Mar. 11, 1975 [NL] Netherlands ..................... 7502841

[51] Int. Cl.² ............................................. C25B 11/00
[52] U.S. Cl. ................................. 204/284; 204/123; 204/129; 204/293; 75/172 R; 429/40; 429/44
[58] Field of Search ............. 204/284, 290 R, 290 F, 204/293, 123, 283, 242; 75/172 R; 429/40, 44

[56] References Cited

U.S. PATENT DOCUMENTS

| | | | |
|---|---|---|---|
| 3,506,494 | 4/1970 | Adlhart | 75/172 R |
| 3,992,271 | 11/1976 | Danzig et al. | 204/293 |

*Primary Examiner*—T. Tung
*Attorney, Agent, or Firm*—Cushman, Darby & Cushman

[57] ABSTRACT

Metal electrodes are prepared by contacting a basis-metal electrode with a solution which contains an alloying element compound, said basis-metal electrode comprising a basis-metal which is present in a finely divided or porous state and is selected from the group consisting of the noble metals from the Groups IB, IIB or VIII of the Periodic Table of the Elements or an alloy of at least one of the metals, said alloying element being selected from the group consisting of an element from Groups IIIA, IVA, VA, VIA, VIII, IB, IIB, VIIB or combinations thereof of the Periodic Table of the Elements; and reducing in situ said alloying-element compound to form the free-alloying element whereby said alloying element forms an alloy with said basis-metal.

19 Claims, No Drawings

PROCESS FOR PREPARING A METAL ELECTRODE

BACKGROUND OF THE INVENTION

This inventions relates to metal electrodes which are composed of an alloy of a basis-metal and an alloying element. In preparing such electrodes, a finely-divided or highly-porous basis-metal is employed such that the metal present in the electrode is in a finely-divided or highly porous state.

More particularly, the present invention relates to a process for preparing a metal electrode having electro-catalytic properties. To improve electro-catalytic properties existent in a basis-metal as defined hereinafter, or to obtain such electro-catalytic properties an alloying element is employed which imparts electro-catalytic properties to the basis-metal. In order to maximize current density per gram of electro-catalytic material, it is preferred that the material be present in a finely divided state or on a suitable carrier.

Electrodes of this type may be made by preparing a suitable metal alloy. Such preparation involves mixing a suitable metal alloy in the form of a powder with a powdery carrier material and, if necessary, in case a porous electrode is required, a pore-forming agent such as sodium sulphate. The whole mixture is then compressed at a high temperature to form an electrode, possibly with sintering. Finally, sodium sulphate, if present, is leached out with hot water. Such a method requires separate preparation of any alloy required, and, hence, is both cumbersome and expensive. Furthermore, compression at high temperatures may bring about substantial undesirable changes in the moistening properties of the electrode, which is particularly objectionable in the case of gas-diffusion electrodes.

Another drawback to such modes of preparation resides in the fact that it is difficult to prepare a series of electrodes having standard properties on a commercial scale.

According to the present invention, a process is provided whereby electrodes (or series of electrodes) differing in alloy constituents, but not in basis-metal, and having standardized properties, can be easily prepared.

A further object of the invention is to provide a means whereby initial basis-metal electrodes can be manufactured on a large scale and thereupon be modified by alloying, as required, and thereby eliminate the separate preparation of alloys.

Still another object of the present invention is to provide a process for preparing metal electrodes wherein the basis-metal is only slightly modified (i.e., a thickness of only up to a few atom layers), thereby providing electrodes having special electro-catalytic properties.

SUMMARY OF THE INVENTION

According to the present invention, metal electrodes are prepared wherein the metal is in a finely-divided or porous state. The metal of the electrode is in the form of a metallic alloy, the constituents of which include a metal as the basis (hereinafter referred to as "basis-metal"), and at least one alloying element (hereinafter referred to as "alloying-element"). In preparing the metal electrodes according to the invention, initially an initial basis-metal electrode is prepared from the basis-metal, optionally together with any fillers, carrier materials, and/or pore-forming substances which may be desirable, depending on the type of electrode ultimately desired. The basis-metal employed in forming the basis-metal electrode should be in finely-divided or highly-porous form. As used herein, the term "finely-divided or highly-porous form" is defined as material having a particle size between about 10 angstroms and about 10 $\mu$m, and/or a porosity of at least 50%. The porosity is the ratio between the volume occupied by the pores and the total volume of the relevant layer. The basis-metal electrode is contacted with a solution of a suitable compound of the alloying-element, and in situ, the compound is reduced, the alloying-element thereby forming an alloy with the basis-metal.

The alloying effect may take place throughout the body of the electrode, or only on the surface thereof. The basis-metal electrode to be treated may comprise the main electrode metal and an electro-catalytic alloy component e.g. a surface layer, or may consist of electro-catalytic alloy, the process of the invention being directed to enhancing the catalytic activity of the said alloy component. Preferably the electrode is a porous electrode and/or the electrode metal is in a finely divided state whereby contact of the electrode metal with the treating solution is expedited.

Generally speaking, any metal or alloy suitable for use as an electrode may be used as a basis-metal. For example, any of the metals, or their alloys, from the Groups VIII, IB and IIB of the Mendeleeff Periodic Table of the Elements may be employed. Of particular note are the noble metals of these groups. Suitable basis-metals, for example, include the noble metals ruthenium, rhodium, palladium, osmium, iridium, platinum silver and gold, as well as alloys of two or more of such metals and metallic, alloys of one or more of such metals with other elements. Preferred basis-metals include palladium, platinum, palladium-platinum and platinum-iridium.

According to one embodiment of the invention, the basis-metal may be present in the basis-metal electrode in a finely-divided state, in combination with a carrier material. Electrically-conductive materials, such as carbon, are suitable as carrier material. For example, metal-laden carbon particles may be cemented together with the aid of a bonding agent. The bonding agent may, for instance, be a polymer material, such as polyethylene, polytetrafluoroethylene of polyvinylchloride.

According to another embodiment, the basis-metal may be dispersed in a porous matrix of carrier material, bonding agent or mixtures thereof. It may constitute the electrode in toto, or be present as a finely-divided layer on a metal electrode e.g. a titanium electrode, or as a component of an electrode comprising a hydrophobic or hydrophobic porous element e.g. a gas-diffusion electrode comprising a hydrophobic porous element coated on one side with bonded porous carrier material carrying finely-divided electrode metal. The basis-metal need not be powdery, but should be coherent and porous in such cases.

The basis-metal electrode may be prepared according to any suitable conventional method. For example, finely-divided basis-metal may be mixed with a powdery carrier material and/or a powdery bonding agent. If desired, a pore-forming agent can be included. The resulting mixture may then be compression-molded at an elevated temperature to form an electrode. The pore-forming agent is then leached out with a suitable agent such as water.

Useful as pore-forming agents include such water-soluble salts as sodium sulfate, sodium carbonate, ammonium carbonate and similar reagents.

Powdery basis-metal may be commercially available platinum black or palladium black. Suitable coherent porous (non-powdery) basis-metal may be obtained by sintering powder of the relevant metal.

The alloying-elements suitable for this invention must be capable of forming an alloy with the basis-metal under reaction conditions. Suitable alloying-elements include elements from the groups IIIA, IVA, VA, VIA, VIII, IB, IIB, and VIIB of the Mendeleeff Periodic Table of Elements. Examples include technetium, rhenium, cobalt, nickel, ruthenium, rhodium, palladium, osmium, iridium, platinum, copper, silver, gold, cadmium, mercury, gallium, indium, thallium, germanium, tin, lead, arsenic, antimony, bismuth, sulphur, selenium and tellurium, as well as mixtures thereof.

Generally, the alloying-element is employed in cationic form in the compounds used. The metal cation may or may not be sequestered with complex-forming ligands. Examples of suitable compounds of this type include copper (II) sulphate, antimony (III) chloride, lead (II) nitrate, cadmium nitrate, gold (III) chloride, bismuth nitrate, potassium antimonyl tartrate, mercury (II) nitrate, gallium sulphate, indium sulphate, tellurium nitrate, tin (II) chloride, and silver nitrate. The alloying-element can also be present in the anionic state, for example, as potassium tellurate, hexachloroplatinic acid, tetrachloropalladic acid, perrhenic acid, or disodiumhydrogen arsenate. The alloying-element compound may also be of an organic nature, for instance, germanium methoxide and alkyltin compounds. Oxides, such as germanium dioxide, copper (II) oxide, arsenic trioxide, and lead oxide, which are soluble in the reaction mixture at the reduction conditions may also be used. It is not necessary for the alloying-element compounds to be fully dissolved in the liquid, since the non-dissolved portion will be dissolved during the process as the dissolved portion undergoes reduction. If necessary, the compound used may contain more than one alloying-element. An example of this is tinplatinumchloride.

Preferably, water is employed as a solvent for reaction, although an organic solvent, in which the compound of the alloying-element is sufficiently soluble, may be used. Thus, suitable organic solvents may include alcohols such as methanol, ethanol, the propanols, or mixtures thereof, with water, especially in combination with compounds of antimony or bismuth.

The pH in the resulting electrolytic solution during reduction is important. At too low a pH, there is a risk of the basic metal becoming wholly or partly dissolved while too high a pH presents a possibility of little or no alloying of the alloying-element and basis-metal occurring. For eacht alloying combination, there is a preferential pH value, at which the alloying process intended proceeds optimally, without an excessive amount of basis-metal becoming dissolved, and a sufficient quantity of alloying-element being formed by reduction. As a rule, a pH of between 1 and 5 produces the best results, although also pH-values outside this range can be used. The reaction medium may be acidified, as required, with strong or weak acids, such as sulphuric acid, nitric acid, hydrochloric acid, phosphoric acid, formic acid, or acetic acid. If necessary, one may buffer the solution, especially if there is a risk of the basis-metal becoming dissolved as a result of too low a pH.

One may regulate the desired composition of the alloy by continuous control of the composition of the solution of the compound of the element to be alloyed. In order to avoid too high a concentration of alloying-element relative to the basis-metal in the alloy, the solution may at a certain point during reduction be replaced by a liquid which is free from alloying-element, for instance, a solution of an inert electrolyte. Alloying may be completed by continuing the treatment with the reducing agent.

For reduction of the alloying-element compound, a reducing agent, preferably, a reducing gas, is employed, particularly hydrogen gas. This is particularly suited for diffusion electrodes, in which the reducing gas can easily be fed to the gas side of the electrode. The quantity of gas supplied may be small, for instance, about 100 N-ml of hydrogen gas an hour per gram dissolved alloying-element, but, of course, higher or yet lower quantities may be used. Other reducing gases, such as carbon monoxide, inert-gas-containing hydrogen and sulphur dioxide, are also suitable. If necessary, the reducing agent may be generated in situ (i.e., generation of hydrogen gas, for instance, by use of electrolysis). Apart from reducing gases, non-gaseous reducing agents may be applied such as hydrazine.

The time necessary to effect reduction of the alloying-element compound and form the desired alloy of basis-metal and alloying-element depends on various factors. As a rule, the alloying reaction requires much more time than does the reduction reaction. Proportionally, as the attainable surface area of the basis-metal per unit of weight is larger (i.e., at an increasing porosity or decreasing metal particle size), the alloying process proceeds more rapidly. The influence of the pH was already discussed above. Of course, the temperature at which the reaction takes place is of great influence. Usually, the alloying process proceeds at a temperature between about 20° C. and the boiling point of the solution but, preferably, at a temperature from about 60° to 90° C. The higher the temperature, the more rapidly the alloying reaction proceeds, but also, the greater the dissolution of the basis-metal and the poorer the dissolution of a gaseous-reducing agent like hydrogen in the reaction medium. The latter is, of course, unfavorable to the reduction process. Also, factors which determine the transfer of reducing gas to the gas-liquid interface are influential. Such factors include the pressure of the gas over the liquid, the solubility of the gas in the liquid, and the dimensions of the gas bubbles in the liquid. Finally, the transport rate of ions in the boundary layer between the solid phase and the gas phase is accelerated by agitation, for example, by stirring.

The process according to the invention can provide different types of electrodes. For instance, electrodes can be obtained for both current-generating purposes, such as for use in fuel cells, and current-consuming purposes, such as electrolysis. The electrodes may be non-porous or of widely-varying porosity. The electrode may be of a hydrophobic, as well as of a hydrophilic nature. The process according to the invention is particularly advantageous in preparing gas-diffusion electrodes.

In the case of non-porous or slightly-porous electrodes, the process is preferably carried out such that a reducing gas is dispersed in fine bubbles in the solution of the alloying-element compound and the basis-metal electrode is immersed in the solution.

Porous, liquid flow-through electrodes are preferably prepared by passing a solution of the alloying-element compound in which the reduction agent is dissolved through the liquid flow-through basis-metal electrode. In this case, it may be of particular advantage to form hydrogen in the nascent state at the surface of the electrode by means of an electric current. The liquid containing the hydrogen moves into the pores of the electrode, the alloying-element there being liberated by reduction and alloying with the pore-bounding basis-metal.

By preference, gas-diffusion electrodes are contacted with the reducing gas on the gas side, while the solution of the alloying-element compound is circulating on the liquid side. The gas enters the pores on the gas side, the liquid on the liquid side, and reduction takes place in the pore, near the gas-liquid contact surface area. Since, with this type of electrode, the supply of the reducing gas, as well as the supply and discharge of the alloying-element compound, are optimal, the alloying process generally proceeds rapidly.

In some cases, especially if the electrode is used as the anode in a fuel cell with hydrogen for fuel, a modification of the electro-catalytic properties may be performed during the operation of the fuel cell. The same is true if the electrode is applied as cathode in water electrolysis. In these cases, the operation need not be interrupted since one need only add a compound of the alloying-element to the electrolyte. Of course, the applicability of this embodiment of the process depends on the nature of the basic-metal, the nature of the alloying-element and its compound, as well as the electrolyte the operating conditions, and the like.

Although, in the process, it is possible to generate the alloying-element electrolytically in situ, whereupon the metal becomes alloyed with the finely-divided or highly-porous basis-metal, preference is given to reduction with the aid of a chemical reducing agent. In the latter case, the best and most homogeneous distribution of the element to be alloyed over the basis metal surface area is achieved.

Generally, it is advantageous first to place the basis-metal electrode in the electro-chemical cell in which it is to be used and to carry out the alloying in this cell.

The following examples are provided to more fully illustrate the invention, but are not to be construed as limiting the scope thereof.

EXAMPLE I

A 50 µm thick coating layer of finely-divided platinum-iridium (30% iridium - 70% platinum by weight) is applied by a conventional vaporization technique to an electrode of titanium metal, thereby forming a basis-metal electrode.

The basis-metal electrode so formed is contacted with an aqueous solution of perrhenic acid having a concentration of 1.0 g/l, said solution having been acidified with glacial acetic acid to a pH of 2.5. The solution is maintained at 80° C. while hydrogen gas at one atmosphere is introduced in fine bubbles with intensive stirring. The hydrogen gas is introduced at a rate whereby an excess is always present over the amount consumed per unit of time. The reaction is carried out over a period of 72 hours at which point the solution is devoid of rhenium.

Electron microscopy and x-ray fluorescence analysis of the metal electrode, so obtained, established that the rhenium has been completely incorporated into the crystal lattice of the platinum-iridium rather than forming a coating layer.

EXAMPLE II

A gas-diffusion electrode (i.e., a basis-metal electrode) having a thickness of 300 µm is prepared. The electrode is composed of two layers, the first of which is about 180 µm thick and constitutes a hydrophobic porous layer of polytetrafluoroethylene having a porosity of from about 50–70%. The second layer, having a porosity of about 50%, consists of active carbon having added thereto 10% by weight (based on the carbon) of finely-divided Pd/Pt in a weight ratio of 9:1 and approximately 15% by weight of polytetrafluoroethylene. The resulting electrode is incorporated in a fuel cell construction and gas is circulated on the hydrophobic side, while an electrolyte is circulated on the carbon side.

The electrolyte is composed of a freshly-prepared solution of sodium antimonyl nitrate having a concentration of 100 mg/liter. The pH of the solution is maintained at about 1 while hydrogen gas is circulated on the gas side of the electrode. After a period of 24 hours, the electrolyte solution is depleted of antimony; and analysis by means of X-ray diffraction confirms that antimony has been incorporated in the crystal lattice of the Pd/Pt alloy.

EXAMPLE III

A hydrogen-air fuel cell is equipped with gas-diffusion electrodes as described in Example II and contains a circulating electrolyte composed of a 30% by weight aqueous sodium hydroxide solution. Germanium dioxide is dissolved in the electrolyte solution to give a concentration of 50 mg/liter. Hydrogen is fed to the anode which, of course, contains the Pd/Pt catalyst material in a weight ratio of 9:1. The fuel cell is operated for a period of 4 hours, a current density of 10–100 mA/cm$^2$ and a temperature of 65° C. whereby the germanium is consumed from the solution forming a Ge/Pd/Pt alloy on the electrode surface.

EXAMPLE IV

A porous gas diffusion electrode is prepared in the same manner as that of Example II, except that 10% by weight of a finely-divided Ag/Pd alloy (weight ratio 3:97) is added to the active carbon. The gas side of the electrode is contacted with hydrogen gas while a 6% by weight sulfuric acid solution containing 50 mg of copper (II) sulfate is circulated on the carbon side at a constant temperature of 65° C. for one hour at which point the solution appears to have been depleted of copper. The hydrogen gas is supplied to the electrode for an additional 48 hours after which it is found that the copper is substantially alloyed with the Ag/Pd.

EXAMPLE V

A solution of tin (II) sulfate in sulfuric acid is prepared according to the method of J. D. Donaldson and W. Moser, J. Chem. Soc., 1960, 4000, and is then diluted to a concentration of 120 mg of tin (II) sulfate/liter. The pH of the solution is adjusted to 1 with sulfuric acid.

Subsequently, the solution is circulated at 75° C. for one week through a flow-through electrode by means of pressure differential.

The electrode employed is composed of porous carbon spherules cemented together and to which 10% by weight of finely-divided Pd/Rh alloy (ratio 1:1) has been added. The solution is saturated with hydrogen gas at 5 atmospheres and at the end of one week, the tin content of the solution is decreased to 21 mg/liter and an Sn/Pd/Rh alloy is formed on the electrode.

The invention, in its broadest aspects, is not limited to the specific details shown and described, but departure may be made from such details within the scope of the accompanying claims without departing from the principles of the invention. Furthermore, the herein-claimed invention may comprise, consist essentially of, or consist of the hereinbefore-recited steps and materials.

We claim:

1. A process for the production of a metal electrode comprising:
   (a) contacting a basis-metal electrode with a solution which contains an alloying-element compound, said basis-metal electrode comprising a basis-metal which is present in a finely-divided or porous state and is selected from the group consisting of noble metals from Group VIII of the Periodic Table of the Elements or an alloy of at least one of the metals, said alloying-element being selected from the group consisting of an element from Group VIIB of the Periodic Table of the Elements or combinations thereof; and
   (b) reducing in situ said alloying-element compound to form the free alloying-element whereby said alloying-element forms an alloy with said basis-metal.

2. A process according to claim 1 wherein said basis-metal is selected from the group consisting of palladium, platinum, palladium-platinum or platinum-iridium.

3. A process according to claim 1 wherein said alloying-element is rhenium.

4. A process according to claim 1 wherein the pH of said solution ranges from about 1 to about 5 during the reduction step.

5. A process according to claim 1 wherein the reducing step is continued after the solution is depleted of said alloying element.

6. A process according to claim 1 wherein the reduction is carried out with a chemical reducing agent.

7. A process according to claim 6 wherein the chemical-reducing agent is hydrogen.

8. A process for preparing a gas-diffusion electrode wherein a basis metal electrode composed of a hydrophobic porous layer of polytetrafluoroethylene and a layer of active carbon having a basis-metal thereon is treated according to claim 1.

9. A process according to claim 8 wherein said basis-metal is platinum-iridium and said alloying-element is rhenium.

10. A process for forming a porous liquid flow-through electrode according to claim 1 wherein reducing in situ is accomplished by electrolysis, thereby forming hydrogen at the electrode surface.

11. A process according to claim 10 wherein said basis-metal is platinum-iridium and said alloying-element is rhenium.

12. A process according to claim 1 wherein said basis-metal is platinum-iridium and said alloying-element is rhenium.

13. A process for the production of a metal electrode comprising:
   (a) contacting a basis-metal electrode with a solution which contains an alloying-element compound, said basis-metal electrode comprising a basis-metal which is present in a finely-divided or porous state and is selected from the group consisting of noble metals from Group VIII of the Periodic Table of the Elements or an alloy of at least one of the metals, said alloying-element being selected from the group consisting of an element from Group IIIA of the Periodic Table of the Elements or combinations thereof; and
   (b) reducing in situ said alloying-element compound to form the free alloying-element whereby said alloying-element forms an alloy with said basis-metal.

14. A process for the production of a metal electrode comprising:
   (a) contacting a basis-metal electrode with a solution which contains an alloying-element compound, said basis-metal electrode comprising a basis-metal which is present in a finely-divided or porous state and is selected from the group consisting of noble metals from Group VIII of the Periodic Table of the Elements or an alloy of at least one of the metals, said alloying-element being selected from the group consisting of an element from Group IVA of the Periodic Table of the Elements or combinations thereof; and
   (b) reducing in situ said alloying-element compound to form the free alloying-element whereby said alloying-element forms an alloy with said basis-metal.

15. A process for the production of a metal electrode comprising:
   (a) contacting a basic-metal electrode with a solution which contains an alloying-element compound, said basis-metal electrode comprising a basis-metal which is present in a finely-divided or porous state and is selected from the group consisting of noble metals from Group VIII of the Periodic Table of the Elements or an alloy of at least one of the metals, said alloying-element being selected from the group consisting of an element from Group VA of the Periodic Table of the Elements or combinations thereof; and
   (b) reducing in situ said alloying-element compound to form the free alloying-element whereby said alloying-element forms an alloy with said basis-metal.

16. A process for the production of a metal electrode comprising:
   (a) contacting a basis-metal electrode with a solution which contains an alloying-element compound, said basis-metal electrode comprising a basis-metal which is present in a finely-divided or porous state and is selected from the group consisting of noble metals from Group VIII of the Periodic Table of the Elements or an alloy of at least one of the metals, said alloying-element being selected from the group consisting of an element from Group VIA of the Periodic Table of the Elements or combinations thereof; and
   (b) reducing in situ said alloying-element compound to form the free alloying-element whereby said alloying-element forms an alloy with said basis-metal.

17. A process for the production of a metal electrode comprising:
   (a) contacting a basis-metal electrode with a solution which contains an alloying-element compound, said basis-metal electrode comprising a basis-metal which is present in a finely-divided or porous state and is selected from the group consisting of noble metals from Group VIII of the Periodic Table of the Elements or an alloy of at least one of the metals, said alloying-element being selected from the group consisting of an element from Group VIII of the Periodic Table of the Elements or combinations thereof; and (b) reducing in situ said alloying-element compound to form the free alloying-element whereby said alloying-element forms an alloy with said basis-metal.

18. A process for the production of a metal electrode comprising:
(a) contacting a basis-metal electrode with a solution which contains an alloying-element compound, said basis-metal electrode comprising a basis-metal which is present in the finely-divided or porous state and is selected from the group consisting of noble metals from Group VIII of the Periodic Table of the Elements or an alloy of at least one of the metals, said alloying-element being selected from the group consisting of an element from Group IB of the Periodic Table of the Elements or combinations thereof; and (b) reducing in situ said alloying-element compound to form the free alloying-element whereby said alloying-element forms an alloy with said basis-metal.

19. A process for the production of a metal electrode comprising:
(a) contacting a basis-metal electrode with a solution which contains an alloying-element compound, said basis-metal electrode comprising a basis-metal which is present in a finely-divided or porous state and is selected from the group consisting of nobel metals from Group VIII of the Periodic Table of the Elements or an alloy of at least one of the metals, said alloying-element being selected from the group consisting of an element from Group IIB of the Periodic Table of the Elements or combinations thereof; and (b) reducing in situ said alloying-element compound to form the free alloying-element whereby said alloying-element forms an alloy with said basis-metal.

* * * * *